United States Patent
Armstrong et al.

(10) Patent No.: US 6,892,743 B2
(45) Date of Patent: May 17, 2005

(54) MODULAR GREENHOUSE

(76) Inventors: Sheila Mary Armstrong, 31910 Charlotte Avenue, Abbotsford B.C. (CA); Ronald B. Armstrong, 31910 Charlotta Avenue, Abbotsford B.C. (CA)

(*) Notice: Subject to any disclaimer, the term of this patent is extended or adjusted under 35 U.S.C. 154(b) by 0 days.

(21) Appl. No.: 10/359,774

(22) Filed: Feb. 7, 2003

(65) Prior Publication Data

US 2004/0154234 A1 Aug. 12, 2004

(51) Int. Cl.$^7$ ............................................. E04H 15/48
(52) U.S. Cl. ..................... 135/143; 47/19.1; 47/26.9; 47/31; 52/4
(58) Field of Search ............... 52/4, 3, 5; 47/19.1, 47/26.9, 31, 17, 29.1, 29.6; 135/143, 124, 125, 126, 115, 97, 121, 117, 907; 74/31

(56) References Cited

U.S. PATENT DOCUMENTS

| | | | | |
|---|---|---|---|---|
| 415,638 A | * | 11/1889 | Hawks | 47/20.1 |
| 912,184 A | * | 2/1909 | Scott | 47/29.6 |
| 2,109,426 A | * | 2/1938 | Hansal | 47/29.2 |
| 3,469,588 A | * | 9/1969 | Rainwater | 135/152 |
| 3,960,193 A | * | 6/1976 | Davis | 108/90 |
| 4,416,928 A | * | 11/1983 | Carl | 428/38 |
| 5,010,909 A | * | 4/1991 | Cleveland | 135/125 |
| 5,331,725 A | * | 7/1994 | Chou | 24/545 |

FOREIGN PATENT DOCUMENTS

| | | | | |
|---|---|---|---|---|
| GB | 2212377 A | * | 7/1989 | A01G/13/02 |

OTHER PUBLICATIONS

Brook Elliott, "Using Wire Mesh in the Garden", Jun. 2002, Mother Earth News, pp. 1–4.*

* cited by examiner

*Primary Examiner*—Naoko Slack
(74) *Attorney, Agent, or Firm*—Oyen, Wiggs, Green & Mutala

(57) ABSTRACT

A portable, modular greenhouse system that can be used to protect plants from harsh conditions. A green house according to the invention comprises a frame and a cover. The frame preferably comprises at least one panel constructed from a mesh of rigid wire, with a spacing between adjacent wires which is large enough to permit a gardener's hand to pass therethrough. The panels are preferably flexible and resilient, so that they return to their original shape after being bent. The cover preferably has sleeves formed in opposite edges thereof. Slats may be inserted into the sleeves, so that when the cover is on the frame the slats are located near the bottom of the frame, thereby weighing down the cover to keep it in place. The ends of the slats may be inserted through the mesh of the panels to further secure the cover to the frame.

16 Claims, 5 Drawing Sheets

MODULAR GREENHOUSE

TECHNICAL FIELD

The invention relates to greenhouses, and particularly to a modular greenhouse that may be folded for storage when not in use.

BACKGROUND

Plants are typically at their most vulnerable when they are just beginning to emerge from the soil. Gardeners located in cold climates may construct miniature greenhouses or "cold frames" in which plants may be germinated. A typical cold frame comprises a rectangular box covered with a removable glass or plastic cover, and is permanently installed in a garden. Once the plants are sufficiently robust to withstand the elements, the gardener transplants them from the cold frame to an open air garden plot.

SUMMARY OF INVENTION

The invention provides a greenhouse comprising a frame made up of at least one panel constructed from a resilient wire mesh. A cover is configured to fit over the frame, the cover comprising a clear plastic material. The cover preferably has one or more sleeves formed in one or more edges thereof, with a slat inserted into each sleeve. The cover is placed over the frame and the slat weighs down the cover to keep the cover on the frame. The cover may be removed from the frame and the frame may be flattened for storage.

The frame may comprise two rectangular panels pivotally coupled together at top edges thereof by at least one fastener. One of the rectangular panels may have a plurality of tines extending from a bottom edge thereof. One of the rectangular panels may have a tine bearing member pivotally coupled to a bottom edge thereof. A crossbar may be connected between the two rectangular panels.

The frame may comprise a central panel with a plurality of tines extending from a bottom edge thereof, and a pair of lateral panels pivotally coupled at top edges thereof to a top edge of the central panel by at least one fastener. Each of the pair of lateral panels has a height greater than a height of the central panel, and when the tines of the central panel are inserted into a planting medium the lateral panels extend outwardly on either side of the central panel, with bottom edges of the lateral panels resting on the planting medium.

The fastener may comprise an elastic loop with a ball attached thereto, a bushing with a slit therethrough or a velcro strip having a hook side and a loop side, with a tab at one end of the strip.

The frame may comprise a single rectangular panel bent to a desired curvature, with at least one crossbar connected between a pair of wires of the single rectangular panel to maintain the desired curvature. Alternatively, the single rectangular panel may have a pair of tine bearing members pivotally coupled to opposite edges thereof, the pair of tine bearing members configured to be inserted into a planting medium to maintain the desired curvature.

The cover may have a pair of sleeves formed in a pair of opposed edges thereof, and a pair of slats may be inserted into the pair of sleeves. The cover may comprise a zipper.

The invention also provides a greenhouse comprising a frame, the frame comprising four rectangular wall panels pivotally coupled together at side edges thereof by a plurality of fasteners, and two rectangular roof panels, each of the roof panels pivotally coupled to a top edge of one of two opposite wall panels, the wall and roof panels constructed from a resilient wire mesh, a cover, the cover sized to fit over the frame, the cover comprising a pair of zippers, the pair of zippers defining an access panel therebetween, the access panel having a sleeve formed in a bottom edge thereof, and, a slat inserted into the sleeve.

The invention also provides a method of erecting a greenhouse on a planting medium. The method comprises providing a frame comprising two panels constructed from a resilient wire mesh, pivotally coupling the two panels together at top edges thereof by means of at least one fastener, placing bottom edges of the two panels on the planting medium in spaced apart relation and covering the frame with a cover, the cover comprising a clear plastic material sized to fit over the frame.

The invention also provides a method of erecting a greenhouse on a planting medium. The method comprises providing a frame comprising a panel constructed from a resilient wire mesh, bending two opposite edges of the panel toward each other so that the panel assumes a desired curvature, connecting at least one crossbar between a pair of wires of the panel to maintain the desired curvature, placing the two opposite edges on the planting medium and covering the frame with a cover, the cover comprising a clear plastic material sized to fit over the frame.

The invention also provides a kit for constructing greenhouses, the kit comprising a plurality of panels constructed from a resilient wire mesh, a plurality of fasteners configured to couple two or more of the panels together for form frames and a plurality of covers, the covers comprising clear plastic material sized to fit over the frames. The covers may have at least one sleeve formed in at least one edge thereof, and the kit may further comprise a plurality of slats configured to be inserted into the sleeves. The kit may also further comprise at least one time bearing member configured to be attached to one of the panels, and at least one crossbar configured to be connected between two of the panels.

BRIEF DESCRIPTION OF DRAWINGS

In drawings which illustrate non-limiting embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

The invention provides a portable, foldable, modular greenhouse system that can be used to protect plants from harsh conditions. A green house according to the invention comprises a frame and a cover. The frame preferably comprises at least one panel constructed from a mesh of rigid wire, with a spacing between adjacent wires which is large enough to permit a gardener's hand to pass therethrough.

The panels are preferably flexible and resilient, so that they return to their original shape after being bent. The panels may be manufactured in a plurality of standard sizes, so that they may be used to construct frames varying widely in size and shape. The frames are preferably able to be flattened for storage when the greenhouse is not being used.

The cover preferably comprises a piece of light-transmitting (whether clear, transparent or translucent) flexible material, such as a clear plastic sheet, sized to fit over the frame. The shape of the cover will depend on the frame configuration. The cover preferably has sleeves formed in opposite edges thereof. Slats may be inserted into the sleeves, so that when the cover is on the frame the slats are located near the bottom of the frame, thereby weighing down the cover to keep it in place. The ends of the slats may be inserted through the mesh of the panels to further secure the cover to the frame.

Figure 1:
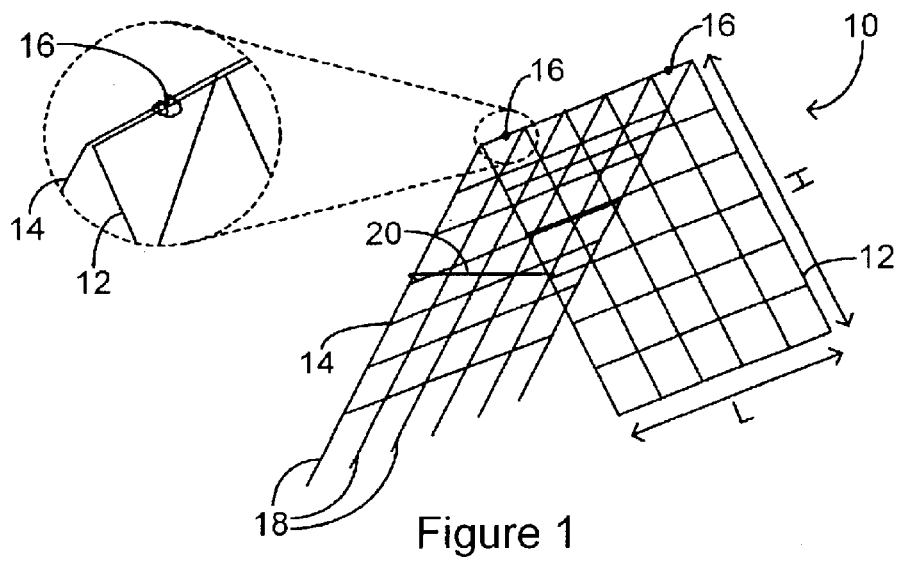
FIG. 1 is an isometric view of a frame for a greenhouse according to a preferred embodiment of the invention.

FIG. 1 shows a frame 10 according to a preferred embodiment of the invention. In this embodiment, frame 10 comprises a first panel 12 and a second panel 14, which are pivotally coupled at their top edges by fasteners 16. The construction of fasteners 16 is described below with reference to FIGS. 10 to 12. All four edges of first panel 12, and all edges but the bottom edge of second panel 14, are preferably smooth. Second panel 14 preferably has a plurality of integrally formed tines 18 extending downwardly from its bottom edge. First and second panels 12 and 14 are preferably each constructed from a rigid wire mesh, and tines 18 preferably comprise rigid extensions of the vertical wires of the mesh of second panel 14. Tines 18 are configured to be stuck into a planting medium such as soil (not shown) to hold second panel 14 in place. First panel 12 may be pivoted about fasteners 16 and lifted to permit the gardener to access plants (not shown) located under frame 10. Frame 10 may also comprise one or more crossbars 20.

Figure 2:
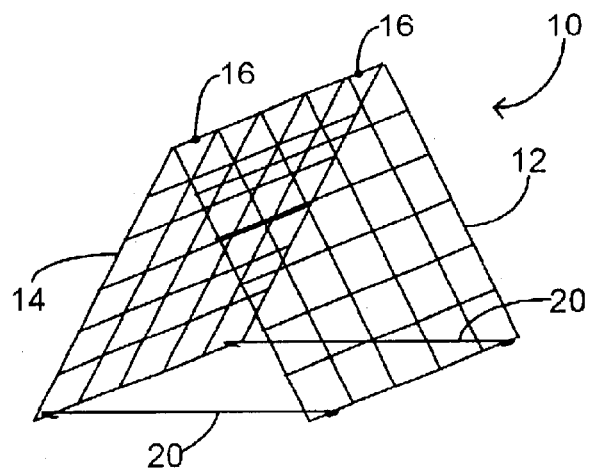
FIG. 2 is an isometric view of a frame for a greenhouse according to another embodiment of the invention.

FIG. 2 shows another embodiment of frame 10 according to the invention. The FIG. 2 embodiment is the same as the FIG. 1 embodiment except that there are no tines, and crossbars 20 are connected between first and second panels 12 and 14. Crossbars 20 may vary in size, and may be connected at any level on frame 10. In the FIG. 2 embodiment, crossbars 20 are connected to first and second panels 12 and 14 at their bottom edges. Crossbars 20 prevent frame 10 from collapsing by maintaining the angle between first and second panels 12 and 14. Each crossbar 20 preferably comprises a rigid wire with a hook at either end. The hooks of crossbar 20 are configured to engage the wires of first and second panels 12 and 14, and prevent panels 12 and 14 from pivoting outwardly when engaged.

Figure 3:
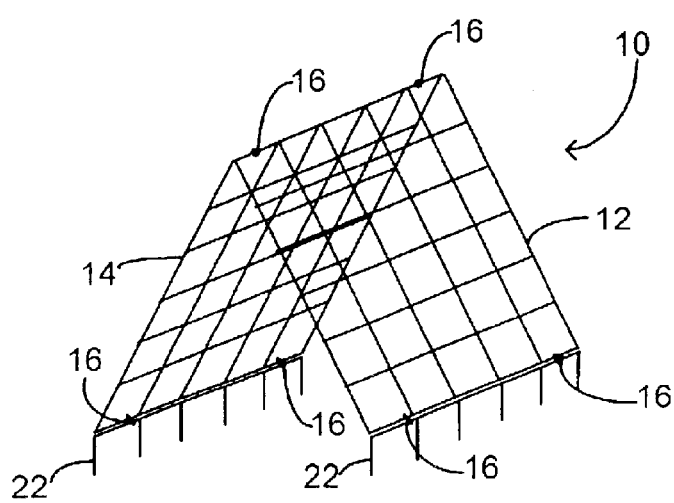
FIG. 3 is an isometric view of a frame for a greenhouse according to another embodiment of the invention.

FIG. 3 shows another embodiment of frame 10 according to the invention. The FIG. 3 embodiment is the same as the FIG. 2 embodiment except that there are no crossbars and each of first and second panels 12 and 14 has a tine bearing member 22 pivotally coupled to its bottom edge by fasteners 16. Any of the frames 10 of FIGS. 1 to 3 may be flattened for storage by removing any crossbars 20 and pivoting first and second panels 12 and 14 toward each other.

Figure 4:
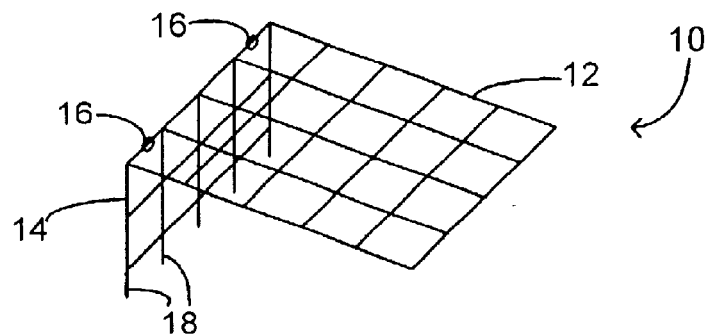
FIG. 4 is an isometric view of a frame for a greenhouse according to another embodiment of the invention.

FIG. 4 shows another embodiment of frame 10 according to the invention. The FIG. 4 embodiment is the same as the FIG. 1 embodiment except that second panel 14 is shorter than first panel 12 so that tines 18 on the bottom of second panel 14 may be inserted into the planting medium such that second panel 14 is vertically oriented. First panel 12 may be pivoted upwardly to allow access to plants (not shown) under frame 10. Any of the frames 10 of FIGS. 1 to 4 may be flattened for storage by removing any crossbars 20 and pivoting first and second panels 12 and 14 toward each other.

Figure 5:
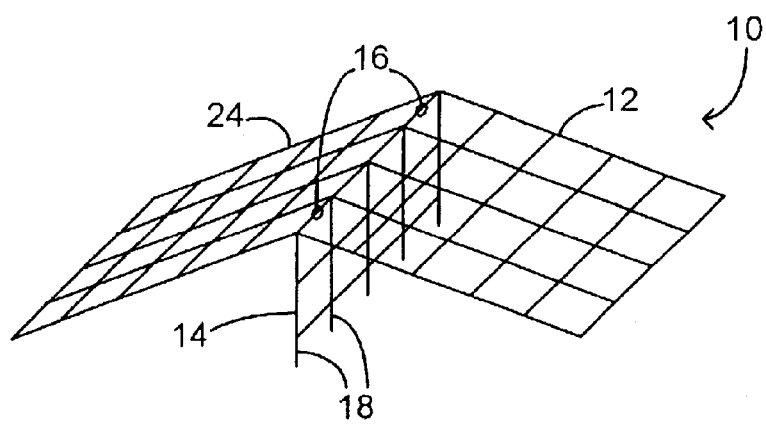
FIG. 5 is an isometric view of a frame for a greenhouse according to another embodiment of the invention.

FIG. 5 shows another embodiment of frame 10 according to the invention. The FIG. 5 embodiment is the same as the FIG. 4 embodiment except that a third panel 24 is pivotally coupled to first and second panels 12 and 14 by fasteners 16. Third panel 24 is identical to first panel 12 in this embodiment. Both first and third panels 12 and 14 may be pivoted upwardly to allow access to plants (not shown) under frame 10. The frame of the FIG. 5 embodiment may be flattened for storage by pivoting first, second and third panels 12, 14 and 26 toward each other.

Figure 6:
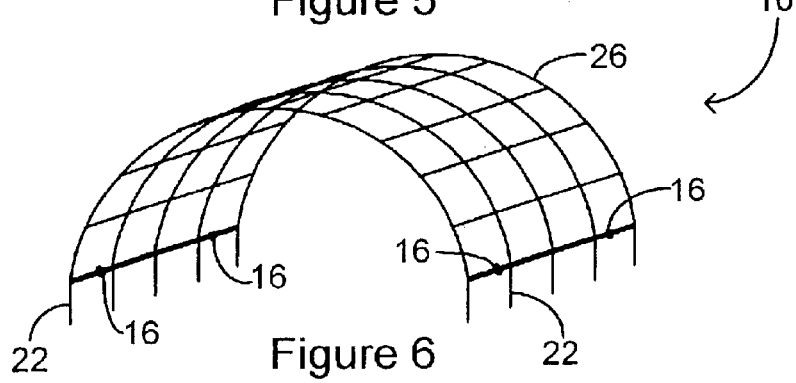
FIG. 6 is an isometric view of a frame for a greenhouse according to another embodiment of the invention.

FIG. 6 shows another embodiment of frame 10 according to the invention. In the embodiment of FIG. 6 frame 10 comprises a single panel 26, with tine bearing members 22 pivotally attached to opposite ends thereof by fasteners 16. Panel 26 is bent to a desired curvature and tine bearing members 22 are stuck into the planting medium to keep panel 26 in place. One or more crossbars 20 as shown in FIG. 7 may also be used to maintain the curvature of panel 26.

Figure 7:
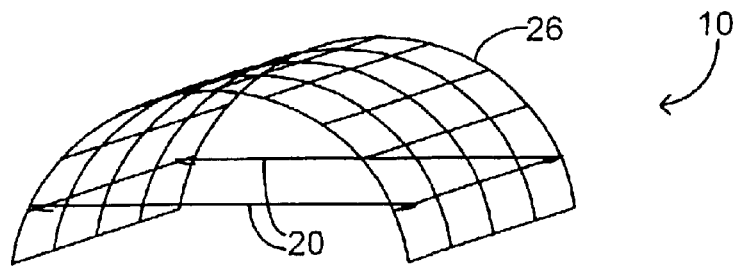
FIG. 7 is an isometric view of a frame for a greenhouse according to another embodiment of the invention.

FIG. 7 shows another embodiment of frame 10 according to the invention. The FIG. 7 embodiment is the same as the FIG. 6 embodiment except that there are no tine bearing members attached to panel 26. Instead, crossbars 20 are connected to panel 26 near its opposite ends to maintain the curvature of panel 26. The frame of the embodiments shown in FIGS. 6 and 7 may be flattened for storage by removing tine bearing members from the planting medium and/or by unhooking crossbars 20 from panel and allowing panel 26 to spring back into its flat position.

Figure 8:
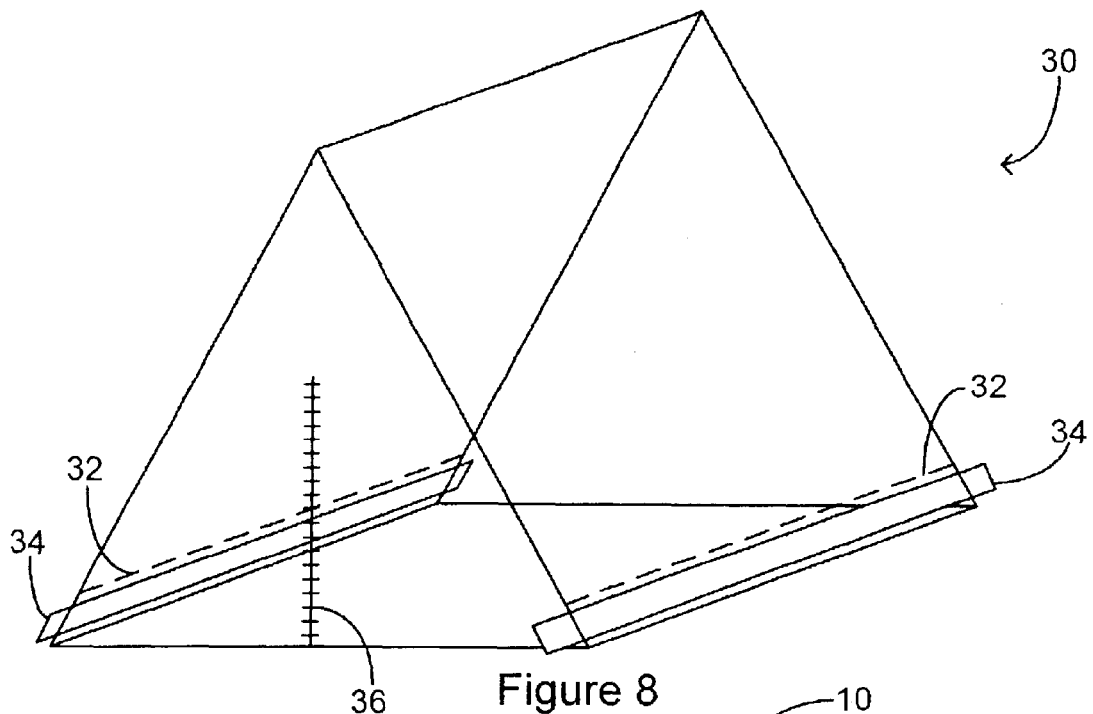
FIG. 8 is an isometric view of a cover for use with the frame of FIG. 1.

FIG. 8 shows a cover 30 according to a preferred embodiment of the invention. Cover 30 of FIG. 8 is configured to fit over frame 10 of FIG. 1. The size and shape of cover 30 depends on the size and shape of frame 10. Cover 30 is shown standing upright in FIG. 8 for ease of illustration, but cover 30 is preferably constructed from a light-transmitting lightweight plastic material that would not stand up on its own. Cover 30 preferably has a sleeve 32 formed in each of two opposite sides. Slats 34 are inserted into sleeves 32, and preferably extend slightly from the ends of sleeves 32. Each slat 34 is preferably constructed from a flexibly resilient plastic material, and has rounded corners and edges so as not to damage cover 30. Cover 30 may have one or more zippers 36 therein to facilitate access to plants (not shown) under cover 30.

Alternatively, cover 30 may comprise a rectangular sheet of light-transmitting plastic sized to fit over frame 10, with sleeves 32 and slats 34 in two opposite sides thereof. In this embodiment, sleeves 32 are of length L (see FIG. 1), but the sides of cover 30 extend beyond sleeves 32 by an amount sufficient to provide enough material to cover the ends of frame 10. The ends of slats 34 may be inserted through the bottom corners of first and second panels 12 and 14 to hold cover 30 in place.

Figure 9:
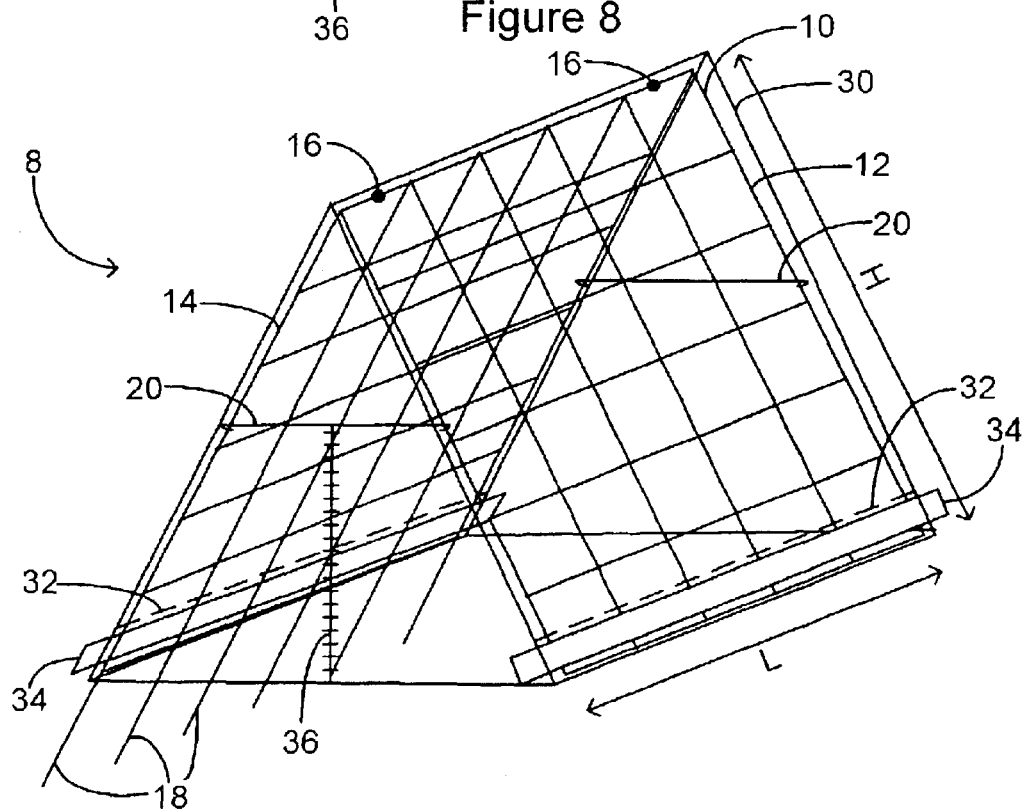
FIG. 9 is an isometric view of the frame of FIG. 1 with the cover of FIG. 8 attached thereto.

FIG. 9 shows a greenhouse 8 according to a preferred embodiment of the invention with cover 30 of FIG. 8 attached to frame 10 of FIG. 1. Frame 10 has crossbars 20 attached between first and second panels 12 and 14 to maintain the angle between first and second panels 12 and 14. Cover 30 is placed over frame 10, and the weight of slats 34 keep cover 30 in place.

Figure 10:
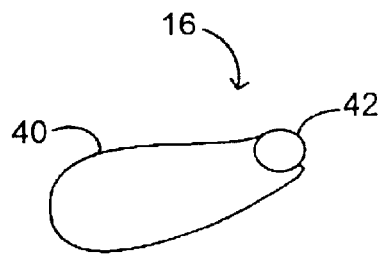
FIG. 10 shows a preferred fastener according to the invention.

FIG. 10 shows a preferred embodiment of fastener 16. In the FIG. 10 embodiment, fastener 16 comprises an elastic loop 40 with a ball 42 attached thereto. Loop 40 may be wrapped around two or more panel wires and stretched over ball 42, thereby holding the wires together while allowing them to pivot with respect to one another. Loop 40 may easily be removed from ball 42 if a user wishes to dismantle frame 10.

Figure 11:
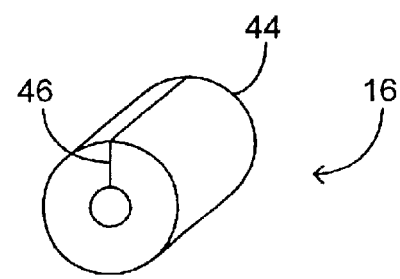
FIG. 11 shows another fastener according to the invention.

FIG. 11 shows another embodiment of fastener 16. In the FIG. 11 embodiment, fastener 16 comprises a rubber bushing 44 with a slit 46 therein. The wires of two or more panels may be slid through slit 46 to be held firmly by bushing 44, and then slit 46 is fused or glued together. Accordingly, two panels held together by bushing 44 may pivot relative to one another, but may only be removed from one another by reopening slit 46.

Figure 12:
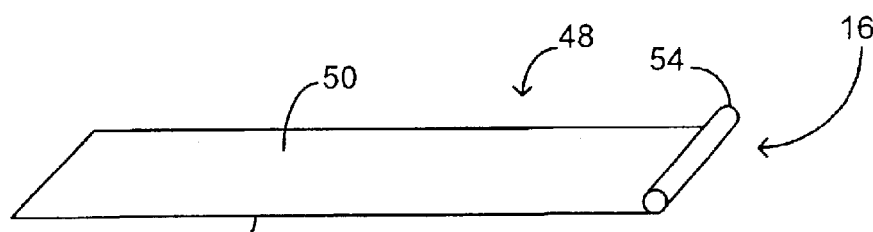
FIG. 12 shows another fastener according to the invention.

FIG. 12 shows another embodiment of fastener 16. In the FIG. 12 embodiment, fastener 16 comprises a Velcro™ strip 48 with a hook side 50 and a loop side 52. A tab 54 is located at one end of strip 48. Strip 48 is inserted between two panel wires so that tab 54 abuts the wires. Strip 48 is then wrapped around tab 54 and the wires, with hook side 50 facing inwardly and the loop side 52 facing outwardly. As with the FIG. 10 embodiment, strip 48 may be easily removed if a user wishes to dismantle frame 10.

Figure 13:
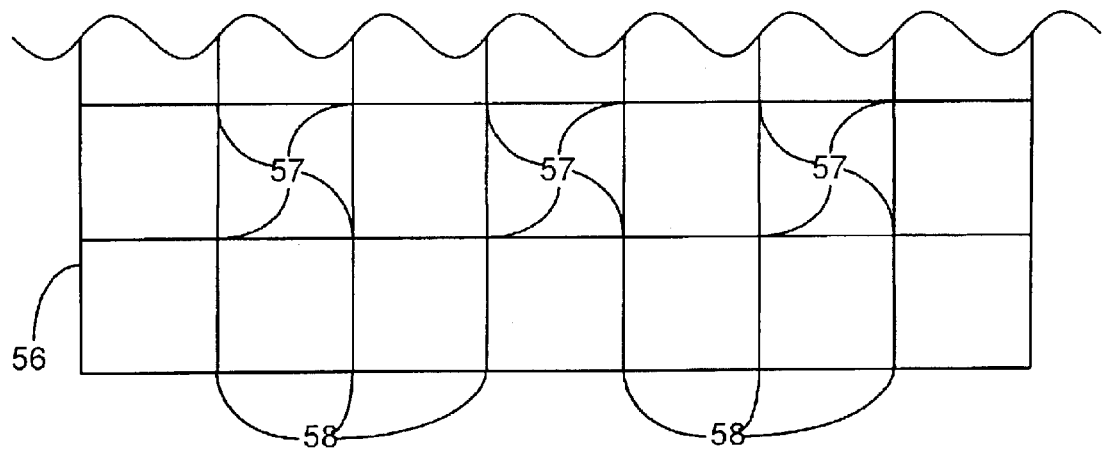
FIG. 13 shows an edge of a panel according to the invention, illustrating a preferred construction thereof.
Figure 14:
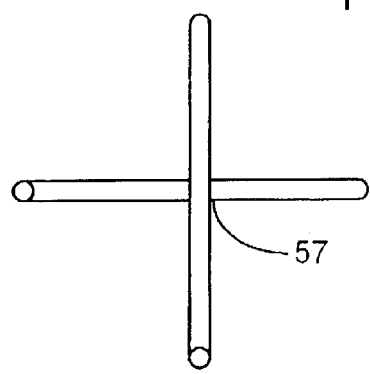
FIG. 14 is a close up view of one of the couplings marked "A" in FIG. 13.
Figure 15:
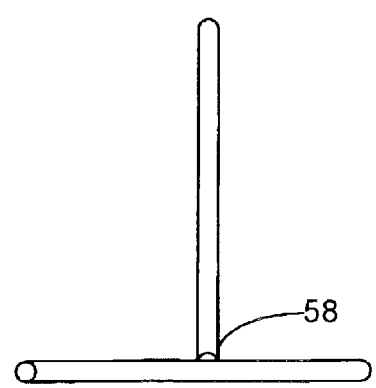
FIG. 15 is a close up view of one of the couplings marked "B" in FIG. 13.

FIG. 13 shows a section of a panel 56 according to the invention. Panel 56 comprises a wire mesh, wherein the wires are preferably welded together at a plurality of interior junctions 57 and peripheral junctions 58. The wires preferably overlap at interior junctions 57, as shown in FIG. 14. The end of the interior wire preferably is butt welded to the edge of the peripheral wire at each peripheral junction 58, as shown in FIG. 15.

Figure 16:
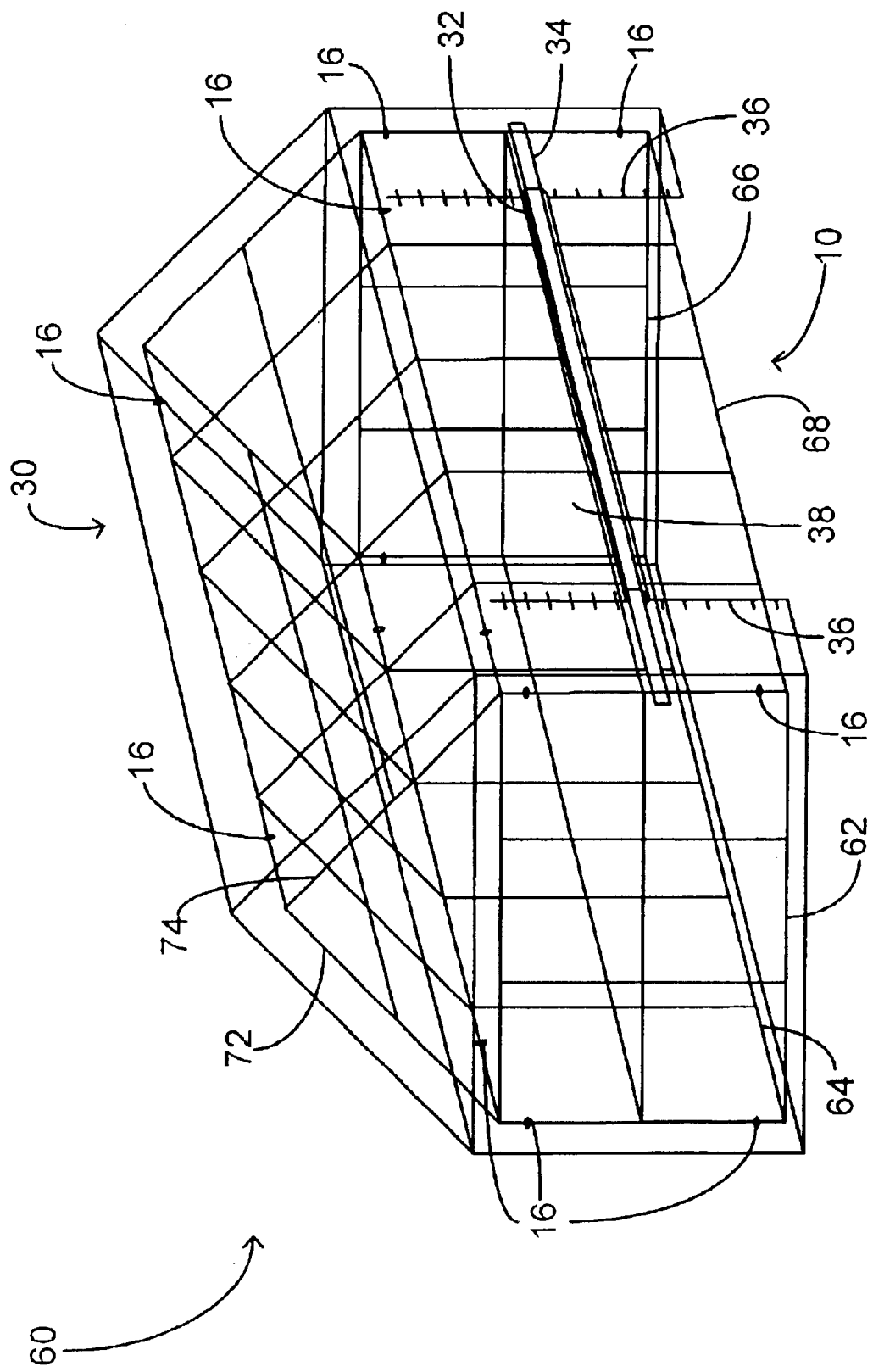
FIG. 16 in an isometric view of a further embodiment of the invention.

FIG. 16 shows a further embodiment of a greenhouse 60 comprising frame 10 and cover 30 according to the invention. In the FIG. 16 embodiment, frame 10 comprises four wall panels 62, 64, 66 and 68 and two roof panels 70 and 72, all joined together by fasteners 16. The fasteners 16 which are used to hold the wall panels 62, 64, 66 and 68 together, and to join roof panels 70 and 72 thereto, may comprise any of loops 40, bushings 44 or strips 48, as shown in FIGS. 10, 11 and 12, respectively. However, the fasteners 16 used to join the roof panels 70 and 72 together are preferably either loops 40 of strips 48, since both of these embodiments allow a user to easily disconnect roof panels 70 and 72 so that frame 10 may be flattened for storage.

Cover 30 of FIG. 16 is configured to fit over frame 10. The separation between cover 30 and frame 10 has been exaggerated in FIG. 16 for ease of illustration. Cover 30 comprises two zippers 36, between which an access panel 38 is defined. A slat 34 is inserted into a sleeve 32 at the bottom of access panel 38. In FIG. 16, zippers 36 are partially unzipped and access panel 38 has been rolled up part way. The ends of slat 34 have been bent behind the edges of wall panel 68 to keep access panel 38 rolled up. Another access panel 38 (not shown) may also be defined on the opposite side of cover 30.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A collapsible greenhouse comprising:
   a. a frame, said frame comprising at least one panel constructed from a wire mesh;
   b. a cover configured to fit over said frame, said cover comprising a light-transmitting flexible material, said cover having one or more sleeves formed in one or more edges thereof, each sleeve having a pair of opposed open ends; and
   c. a slat inserted into each of said one or more sleeves, the slat having a pair of opposed end portions extending out of the open ends of the sleeve,
   wherein said cover is placed over said frame and said slat weighs down said cover and the end portions of said slat are insertable through the wire mesh to keep said cover on said frame, and wherein said cover may be removed from said frame and said frame may be flattened for storage.

2. The greenhouse of claim 1 wherein said wire mesh is resilient and said frame is thereby adapted to form a curved configuration.

3. The greenhouse of claim 1 wherein said frame comprises two rectangular panels pivotally coupled together at top edges thereof by at least one fastener.

4. The greenhouse of claim 3 wherein each of said rectangular panels comprises a plurality of wires welded together at a plurality of interior junctions and a plurality of peripheral junctions, wherein each of the peripheral junctions is butt welded.

5. The greenhouse of claim 3 wherein at least one of said rectangular panels has a tine bearing member pivotally coupled to a bottom edge thereof.

6. The greenhouse of claim 3 further comprising at least one crossbar connected between said two rectangular panels.

7. The greenhouse of claim 3 wherein said at least one fastener comprises an elastic loop with a ball attached thereto.

8. The greenhouse of claim 3 wherein said at least one fastener comprises a bushing with a slit therethrough.

9. The greenhouse of claim 3 wherein said at least one fastener comprises a velcro strip having a hook side and a loop side, with a tab at one end of said strip.

10. The greenhouse of claim 1 wherein said cover has a pair of sleeves formed in a pair of opposed edges thereof, and wherein a pair of slats are inserted into said pair of sleeves.

11. The greenhouse of claim 1 wherein said cover comprises a zipper.

12. The greenhouse of claim 1 wherein said frame comprises four rectangular wall panels pivotally coupled together at side edges thereof by a plurality of fasteners, and two rectangular roof panels, each of said roof panels pivotally coupled to a top edge of one of two opposite wall panels.

13. The greenhouse of claim 12 wherein said cover comprises a pair of zippers, said pair of zippers defining an access panel therebetween.

14. The greenhouse of claim 13 wherein one of said one or more sleeves is formed in a bottom edge of said access panel.

15. A kit for constructing a greenhouse, said kit comprising:
   a. a plurality of panels constructed from a resilient wire mesh for constructing a frame, each panel comprising a plurality of wires welded together at a plurality of interior junctions and a plurality of peripheral junctions, wherein each of the peripheral junctions is butt welded;
   b. a plurality of fasteners configured to couple two or more of said panels together for forming said frame;
   c. a cover comprising a light-transmitting flexible material sized to fit over said frame, said cover having at least one sleeve formed in at least one edge thereof, said at least one sleeve having a pair of opposed open ends;
   d. a slat configured to be inserted into said at least one sleeve; and,
   e. at least one tine bearing member configured to be pivotally attached to one of said panels.

16. The kit of claim 15 wherein said slat has a pair of opposed end portions extending out of the open ends of the sleeve and wherein the end portions of said slat are insertable through the wire mesh.

* * * * *